United States Patent [19]
Brassell et al.

[11] Patent Number: 5,684,510
[45] Date of Patent: Nov. 4, 1997

[54] METHOD OF FONT RENDERING EMPLOYING GRAYSCALE PROCESSING OF GRID FITTED FONTS

[75] Inventors: Lenox H. Brassell, Seattle; Peter D. Pathe, Kirkland; Eliyezer Kohen, Mercer Island, all of Wash.

[73] Assignee: Microsoft Corporation, Redmond, Wash.

[21] Appl. No.: 276,997

[22] Filed: Jul. 19, 1994

[51] Int. Cl.⁶ .................................................. G09G 5/22
[52] U.S. Cl. ........................ 345/143; 345/136; 395/169
[58] Field of Search ................................ 345/144, 149, 345/147, 127–131, 136, 137, 141, 142, 143, 192–195; 395/150, 151, 141, 136, 132, 138, 139, 167–172

[56] References Cited

U.S. PATENT DOCUMENTS

| | | | |
|---|---|---|---|
| 4,367,533 | 1/1983 | Wiener | 345/128 |
| 4,720,705 | 1/1988 | Gupta et al. | 345/136 |
| 4,851,825 | 7/1989 | Naiman | 340/728 |
| 4,908,780 | 3/1990 | Priem et al. | 364/521 |

(List continued on next page.)

FOREIGN PATENT DOCUMENTS

| | | |
|---|---|---|
| WO 94/06094 | 3/1994 | WIPO . |
| WO 94/29843 | 12/1994 | WIPO . |

OTHER PUBLICATIONS

J.E. Warnock, "The Display of Characters Using Gray Level Sample Arrays," Copyright 1980.

W.J. Leler, "Human Vision, Anti–aliasing, and the Cheap 4000 Line Display," Copyright 1980.

F.C. Crow, "The Use of Grayscale for Improved Raster Display of Vectors and Characters," Computer Graphics, vol. 12, No. 3, Aug. 1978.

(List continued on next page.)

*Primary Examiner*—Steven Saras
*Attorney, Agent, or Firm*—Jones & Askew

[57] ABSTRACT

A method of displaying characters on a pixel oriented grayscale display device having a predetermined pixel resolution employing parametric, geometric glyph descriptors is disclosed. The process supports a client process that passes a request for a particular font and a physical character height for the displayed characters as well as the physical resolution expressed in pixels for unit length. A character space height value in pixels is determined and compared to selected values to determine whether the character space height in physical pixels falls into one of three distinct ranges. If within the smallest range, no hinting or grid fitting is performed and the physical pixel coordinates of a scaled glyph descriptor are scan converted using subpixel coordinates. The on subpixels within each pixel are counted to provide a grayscale value for illuminating that particular pixel. If the character space height is in the highest range, the same process is performed after the scaled glyph descriptor is hinted to physical pixel boundaries. Character space heights in the mid range are hinted to the physical pixel boundary but scan converted using a conventional scan converter for the physical pixel space. The on pixels that result from this scan conversion are then illuminated to the maximum grayscale value while off pixels from the conversion are left off. The values of the variables that define the ranges are user selectable and may be varied in response to other parameters.

13 Claims, 6 Drawing Sheets

U.S. PATENT DOCUMENTS

| | | | |
|---|---|---|---|
| 5,128,525 | 7/1992 | Stearns et al. | 235/454 |
| 5,155,805 | 10/1992 | Kaasila. | |
| 5,241,653 | 8/1993 | Collins et al. | 395/138 |
| 5,278,678 | 1/1994 | Harrington | 358/518 |
| 5,301,267 | 4/1994 | Hassett et al. | 395/150 |
| 5,459,828 | 10/1995 | Zack et al. | 395/151 |

OTHER PUBLICATIONS

F.C. Crow and M.W. Howard, "A Frame Buffer System with Enhanced Functionality," Computer Graphics, vol. 15, No. 3, Aug. 1981.

T. Whitted, "Anti–Aliased Line Drawing Using Blush Extrusion," Computer Graphics, vol. 17, No. 3, Jul. 1983.

W.M. Newman and R.F. Sproull, "Principles of Interactive Computer Graphics," Solid–Area Scan Conversion, Chapter 16, pp. 229–245, particular publication date unknown, but published prior to the filing of the referenced application.

Foley, James D., Andries van Dam, Steven K. Feiner and John F. Hughes; *Computer Graphics*, Second Edition; Copyright 1990; pp. 132–143.

Mastering Wordperfect 5.1 & 5.2 for Windows.

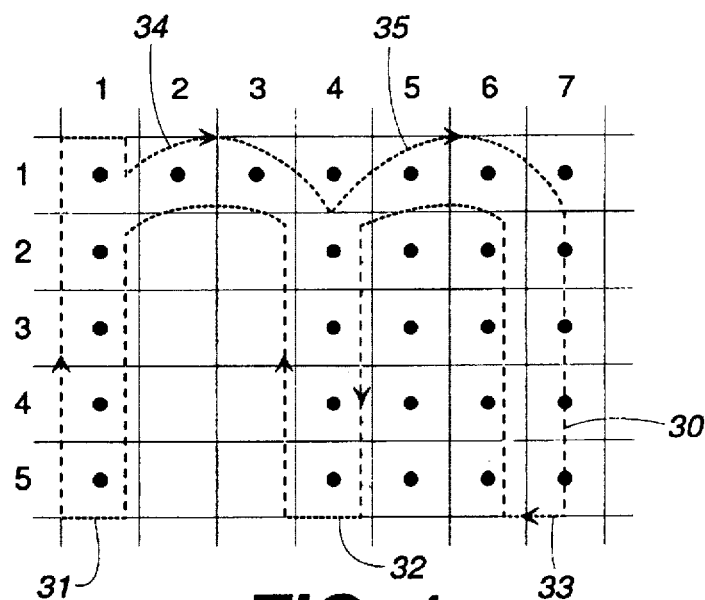
FIG. 1
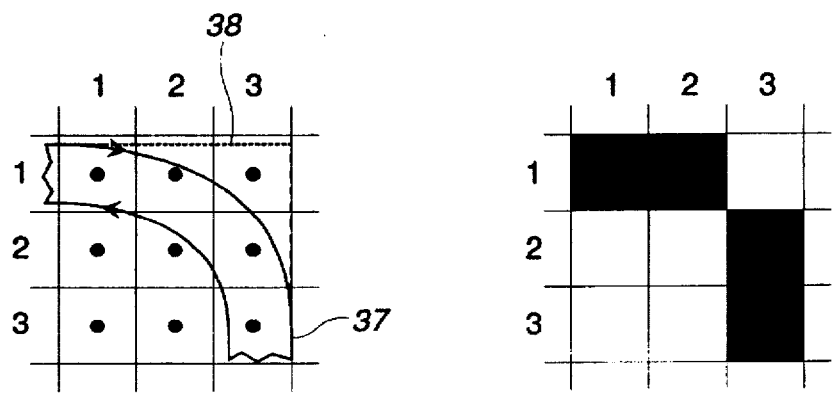
FIG. 2   FIG. 3A
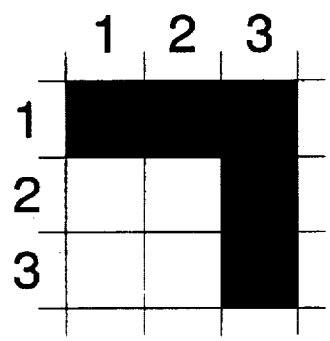
FIG. 3B

METHOD OF FONT RENDERING EMPLOYING GRAYSCALE PROCESSING OF GRID FITTED FONTS

TECHNICAL FIELD

The present invention relates to dynamic rendering of fonts on pixel oriented display devices, including printers and in particular is an improved method of rendering fonts that employs both a combination of grayscale processing for grid fitted (hinted) font outlines and selection of hinting, grayscale processing, or both depending on the relationship between physical pixel size and character height for a particular glyph.

BACKGROUND OF THE INVENTION

This invention relates to rendering and displaying fonts on pixel oriented display devices. The most common pixel oriented displays are raster scan cathode ray tube (CRT) displays, pixel-oriented LCD displays, and pixel oriented laser printing devices. Pixel oriented display devices are very popular and have been used for many years. Their popularity generally arose in the field of pixel oriented raster scan CRT displays for use with computer systems. While vector scopes and analog curve tracers had previously been used in CRT displays, pixel oriented devices have the advantage of simpler control than vector scope devices. It is also easier to achieve stability of the display in response to variations in component characteristics, temperature, and the like.

As is well known to those skilled in the art, a pixel is simply a discrete segment of an overall field in which an image can be displayed. In most devices, pixels are square or round in shape, but many newer pixel oriented display devices include rectangular pixels. A pixel is either activated or not activated when the process that generates the display determines it is appropriate to activate that portion of the image field.

It is well known that use of pixel oriented displays to display features of continuous smooth curves lead to some visual distortions because of the discrete nature of the pixels and their geometry. For example, when a thin straight line is to be displayed diagonally across the screen of a horizontally scanned raster scan pixel display device, the edges will exhibit a stair step characteristic that is commonly referred to as "jaggies". Jaggies, like most other forms of distortion in pixel display of smooth curves, is a species of sampling error. It may be thought of as a distortion that is introduced into the image inherently by the process of sampling the original curve and deciding which discrete pixels should be activated.

While much mathematical work has been done to calculate distortion and quantify descriptions of how much information is retained in sampled systems, display devices are machines that generate output that stimulates a complex nonlinear system, i.e., human visual perception. While mathematical models of human perception have been attempted, it is a complicated phenomena and those working in the field of pixel oriented display devices rely in large part on empirical information about how the human eye perceives various forms of distortion in the display of smooth images on a pixel oriented device.

For example, it has been known for many years that certain types of sampling error distortion can be mitigated by providing additional discrete steps of dynamic range for the intensity of each pixel. This is known as employing a grayscale pixel display. A binary pixel oriented device is one for which the pixel is either on to its maximum intensity or off. A grayscale device is one in which each pixel may take on varying levels of intensity. These are normally selected so that they are perceived by the human eye to step through perceptually equal increments of intensity. If there are n levels of intensity for each pixel, it is referred to as a n-level grayscale device. Because of the use of digital electronic devices to implement most memories in pixel oriented grayscale device, n is usually selected to be an integer power of 2.

It is well know that the use of a grayscale pixel oriented display device mitigates the effects of jaggies for a given width of the displayed line and a given pixel size. Algorithms that determine what portion of a pixel corresponds to the mathematical image to be displayed are employed to generate proportional pixel intensities on the grayscale. Because of integration effects of the human eye, the use of varying gray levels tends to be perceived as a smooth curve even though the geometry of the illuminated pixels remains unchanged, and close inspection will indicate that the stair steps on such a display are still present.

It should be noted that the term "grayscale" for variable intensity pixels originated in the environment of monochrome displays. It is still used, and is used in this specification, to also include color displays. The concept of grayscale thus refers to increments of intensity or density, irrespective of hue, for a particular display device.

The explosive growth of the use of personal computers in the last decade has been accompanied by an increase in complexity of several orders of magnitude of the operating systems used by such computing devices. Accompanying this has been an increase in the resolution of CRT display devices and the use of high resolution laser printers to generate paper and transparency output. As personal computing systems have moved toward multiple tasking operating systems such as the Windows operating system of Microsoft, most all screens displays of alphanumeric text are generated with the physical display device being operated in a graphics mode. As is known to those skilled in the art, a graphics mode for a display is one in which information for each pixel element is stored in a display memory under the control of a program that determines which pixels should be activated, and to what level (for grayscale devices) and hue (in the case of multi-color devices). Text modes for a display are ones in which codes representative of particular characters in a character set supported by the display device are stored at memory locations corresponding to character positions and fixed routines or character generation memories are provided for generating the characters at those positions. Normally only a few text modes are supported by any given hardware controller for a display device.

Because users often desire to change the size of text that is displayed on a screen or a printer, a rather substantial body of technical art has arisen in the area of storing and rendering fonts on pixel oriented display devices. Modern operating systems such as Microsoft Windows™ operating system and the operating system used on Apple Macintosh computers, provide displays that will display text from applications in varying fonts and in various sizes. The selection of character size is changed dynamically and fonts can be changed independently of modifications to the stored text in memory or a disk file controlled by the application. Therefore, modern image processing is generally performed by software that performs the function of complex drivers between the operating system and the application. These programs accommodate font descriptions specified by the application, or independent third parties, according to descriptor rules set by the manufacturers of the driver programs and operating system. Much of the art of image processing of this type is designed to reduce the memory required by the inherently memory intensive activity and to increase the speed of operation so that the versatility obtained by rendering fonts and various sizes is not achieved at a cost of an unacceptable reduction in speed of running the application. The present invention is an improvement to such image processing drivers. The need for it arose because many conventional practices adopted by designers of fonts for binary pixel display devices cause a diminution in quality when used with grayscale display devices having a relatively large number of grayscale levels for each pixel.

As is known to those skilled in the art, a particular font refers to particular geometric characteristics of the characters within a character set. Stylized fonts originated prior to the use of movable type, but for several hundred years the art of typography generated many fonts, each of which had to physically be rendered in physical type face elements. Today, there are many fonts in use and they are selected, largely on subjective and aesthetic criteria, for a given application.

As physical pixel oriented display devices have achieved higher and higher resolution, it has become possible to display text in smaller and smaller characters on pixel oriented display devices while still maintaining readability. However, as physical character size gets smaller for a display device of a given resolution, the inevitable problems of sampling errors begin to reassert themselves.

In particular, one type of sampling error that commonly occurs when displaying characters of a given font on a pixel oriented device arises is called dropout. It normally occurs when the ratio of minimum stroke width to pixel size gets low. The minimum stroke width is the minimum physical size of a feature of a character to be displayed. This problem will naturally arise even if the physical size of the character to be displayed is rather large, if the resolution of the device is low. However, given the availability of modem high resolution CRT and laser printing devices, it is mostly problematic when characters are to be displayed with a small physical size.

The phenomenon of dropout occurs when the decision making algorithm for activating a pixel determines that a particular pixel should not be activated where it causes a break at a point in a character that the viewer would expect to be a part of a continuous line. It is known that the subjective response of a reader to dropout is to prefer having a pixel illuminated, even if it tends to geometrically distort the character, over a situation in which an inappropriate discontinuity occurs in the strokes of the character. Therefore, there is a subset of the art of font and other image rendering in pixel oriented devices that addresses the subject of dropout control so that the resultant displayed image is most pleasing to viewers.

One aspect of hinting is making slight distortions in curvilinear portions of the glyph in order to make sure that centers of pixels are covered by the glyph description when it is rendered with low resolution. Glyph is a generic term that refers to a typographical element that is a member of the font under consideration Thus, glyphs include characters, numbers, punctuation and any other image that is outlined for a given font. Thus, hinting by introducing slight distortions is one form of dropout control. Additionally, hinting controls alignment between character features and character spacing so that rendered characters appear properly and evenly spaced to the viewer. Hinting aids in control of the weight of glyph strokes and maintaining shapes of diagonal strokes when rectilinear pixels are used as well as maintaining the openness of contours.

It is known that font designers have built into their font specifications, hints that are designed to improve the rendered result at low resolutions, i.e., where the minimum stroke width for the glyph covers a small number of physical pixels in the display device. These hints are generally slight distortions of what would otherwise be a "true" mathematical description of the font contour in order to make sure that it will cover certain pixel centers and thus avoid dropout problems.

If viewed on a large scale, these hinted glyph descriptions have what are perceived as somewhat odd and inappropriate bumps or lumps in the contours. By and large, the hinting rules tend to specify hinting the outer edge of long vertical strokes to a physical pixel boundary and expanding the outside edge of the first adjacent curvilinear portion to make sure that the center of the next pixel is covered so as not to cause a dropout as the glyph stroke begins a curve.

Most modern printing drivers and computer operating systems that support multiple size renderings of application specified fonts define a protocol for specifying and defining the glyphs of a font. The Microsoft Windows™ operating system employs a True Type specification that is well known to those skilled in the art. This description is a definition of points expressed in font units ("FUnits") located within a square referred to as the em square. The number of FUnits per square is selectable by the font designer, within a predetermined range. The number of FUnits per em square is thus an expression of the resolution of the font design selected by the designer. Naturally, as the FUnits per em square increases, the ability of the font designer to describe finer detail or better defined curvilinear strokes of a glyph increases.

The glyph for a given character in a font is described as a numbered sequence of points that are on or off a curve defining the boundary of a glyph contour. In general, it is only required that there is a recognized rule for how the points relate to the area to be filled and the area not to be filled when rendering the glyph. In True Type font descriptions, the points are numbered in consecutive order so that as a path is traversed in the order of increasing point numbers, the filled area will always be to the right of the path. Thus, the font designer's specification in an em square is a geometric descriptor of a character in a normalized character space.

When an application requests use of the font for display, it specifies the physical size of the character on the display device by specifying its height. Furthermore, the display device has a predetermined pixel size. These two pieces of information tell the rendering program how to scale the font description so as to map the description from the FUnits of the em square into physical pixel units for the display device to be employed in displaying the character in that particular size. Thus, in response to a request for displaying a particular character size on the display device, the rendering program must scale the geometric descriptor to provide a scaled geometric description in physical pixel coordinates. This description is a function of the predetermined physical pixel size of the display device and the requested character area size.

The interface between a font description and a True Type font file and the True Type image processor makes a number of parameters available to the font designer. This, combined with the corresponding interface between an application requesting a True Type font provide many options to the font designer. For example, an application making a request to the True Type image controller must specify both the physical size (height in points) of the character to be displayed and the resolution in pixels per inch on the physical device upon which the character is to be displayed. It should be kept in mind that the concept of display of a character includes temporary display such as a CRT device as well as more permanent image creation in the form of a printer.

The Microsoft True Type image processor provides the font designer with a large number of parameters by which aspects of a given font may be varied. In particular, a font designer may specify an entirely different descriptor for one or more characters in a font depending on the physical size of the characters to be displayed, the resolution of the physical device (i.e., pixel size) or a relationship between these parameters. Additionally, True Type provides the font designer with a robust hinting language that can be used to apply hints to a font description as a function of the parameters passed from the application calling for use of the font. This language includes a robust instruction set that allows the font designer to tailor the font to particular circumstances to virtually any degree that he or she is willing to consider. Among the instructions are mathematical scaling, shifting of the font within the em square, hinting to physical pixel boundaries and relocating particular points in the succession of on-curve and off-curve points that constitute the glyph descriptor described above.

As noted hereinabove, most font designers for True Type fonts have included point movements when characters are displayed on low resolution devices, based in large part on empirical observation of the performance of the font in particular applications. Generally, the types of hinting described hereinabove are performed in environments other than True Type image processors designed by Microsoft Corporation. The present invention grew out of a need to overcome problems that existing font design practices create when fonts are rendered on grayscale display devices, particularly in circumstances where there is a relatively small number of pixels per em square. However, it is applicable to other environments since similar types of hinting are common practice for designers of fonts for use in other image processing environments.

The employment of grayscale in a display device that can handle same is very useful for mitigating or eliminating the perception of jaggies, particularly on pixel oriented displays of curves of moderate radii of curvature and diagonal lines. However, it is also well known that the perception of sharpness and readability of type faces is very dependent on sharp transitions between filled and unfilled areas along straight runs of a glyph stroke. Since the pixels in most pixel oriented devices tend to be square (a special case of rectangular), it is desirable to have a sharp well defined transition at pixel boundaries for vertical and horizontal runs of a glyph stroke. This is known to increase the perceived sharpness and readability. Therefore, when employing grayscale devices, it is not desirable to have an interim gray level on the border of a horizontal or vertical run. This can be appreciated by considering that the use of gray level along representation of a diagonal line tends to blur or make somewhat fuzzy the jagged detail of the stair step jaggies. This blurring is a benefit in overcoming the unpleasant perception of jaggies, but is perceived as a diminution in quality when it blurs a vertical or horizontal run where the viewer would prefer a sharp transition from the lowest grayscale level to the densest grayscale level.

The inventors of the present invention have discovered that applying conventional rendering rules to currently existing font specifications when the output device has grayscale capability produces unpleasant results when small character sizes of low resolution are displayed. Considering the foregoing, the source of this will be appreciated.

Font design is a complex and tedious process. Furthermore, there is a large installed base of font specifications that include hints of the type described above that were designed for binary display devices and give unpleasant results when rendered on a grayscale display device. Therefore, there is a need in the art for a method of displaying characters from existing font specifications on grayscale devices that will overcome the tendency of the distortions (i.e., the hints) that were included to avoid dropout to produce worse than necessary appearing distortions when used with a grayscale display. Furthermore, there is a need to interface both existing and future font designs to computer programs for controlling display of characters in a way that maximizes the perceived visual quality of the rendered characters when printed on grayscale devices, over a wide range of character sizes for a given pixel size on the display device.

SUMMARY OF THE INVENTION

The present invention fulfills the above described need by providing a method of rendering fonts for display on a grayscale device that employs both the grid fitting form of hinting and super sampling of physical pixel space to select a grayscale output level for each pixel. The combination of these two techniques has not been heretofore known in the prior art. This combination is most advantageously used in the display of characters of a size on a particular device such that the character space in which the character is to be displayed is 18 or more physical pixels high. In prior art font renderings, grid fitting was not generally employed when a character was to be displayed with high resolution as the problems that grid fitting was basically designed to overcome do not manifest themselves to a significant degree with high resolution. However, if the glyph descriptor is such that it generates a long horizontal or vertical straight run that substantially bisects a pixel, the boundary will be displayed as mid-level grayscale. This creates the impression of a fuzzy character, i.e., one that is not sharp. This is due to the well known phenomenon that perceived quality of print is largely a function of high contrast boundaries for a character.

Thus, the first aspect of the present invention is one that employs grid fitting in circumstances where it was previously considered an unneeded expedient in the prior art followed by an otherwise conventional grayscale rendering of a glyph.

According to a second aspect of the present invention, the height of the character space to be displayed in physical pixels is first determined and compared to a pair of selected values. Depending on the relationship among the selected values and the size of the displayed character space and physical pixels, either grayscale rendering alone, grid fitting alone with binary pixel values being rendered, or the above described combination of grid fitting and grayscale rendering is employed to display characters. In particular, selected integer values J and K are either passed to the system performing the method of the present invention or selected by default in the absence of instructions from an application or a font description. As described further hereinbelow, parameters J and K specify values for the height of the character space in physical pixels. In other words, these are parameters that relate to the number of pixels occupied by the vertical extent of the scaled em square on the physical display or printing device having a given resolution. Parameters J and K are used to control the selection of hinting and full pixel or subpixel scan conversion. A character height value P of the character to be displayed, in physical pixels, is compared to selected values J and K; J and K being integers and J normally being less than K. When P is less than J, no grid fitting is performed and other character hints that may have been specified by a font designer are ignored.

When P is greater than or equal to J and less than or equal to K, the glyph description is grid fitted to physical pixel boundaries. Then a scan conversion is done, in a conventional manner based on physical pixel sizes. In this context, a conventional manner indicates that a scan designed to provide output to binary, i.e., two level, pixels is employed. Grayscale values of the maximum level or the minimum level (i.e., off) are then used to fill a grayscale pixel map as a result of this conversion.

When the value of P is greater than the second selected value K, the glyph descriptor is first grid fitted. Then, the physical pixel space is subdivided into an integer number of subpixels, the integer number preferably being an integer power of 2, and a bilevel scan conversion is performed using the grid fitted glyph descriptor and the subpixels. This creates a table of on and off subpixels for the portion of the character space covered by the glyph. Subsequently, for each physical pixel, a grayscale value is assigned as a function of the number of subpixels that were turned on by the scan conversion process.

In its preferred form, the grayscale level is simply proportional to the number of subpixels that were turned on by the scan conversion. Therefore, the process of selecting a gray level is simply counting the on-subpixels that result from the scan conversion. Naturally, non-linear subpixel to grayscale level conversions can be employed in embodiments of the present invention although a linear conversion is believed to provide the best results. Most particularly, a non-linear relationship between the number of subpixels turned on and the ultimate physical pixel grayscale level that is output can be used to do gamma correction similar to that employed in conventional broadcast color television. Gamma correction offsets the non-linearity of conventional cathode ray tube devices, and also aids in suppressing perceived noise at relatively low luminance levels. Thus, it should be understood that all references to processes for counting subpixels to determine the grayscale level included within this specification include the possibility of outputting a grayscale level proportional to the count raised to a positive exponent greater than unity. Generally, gamma correction for CRTs employs a value of gamma (i.e., the above mentioned exponent) in the range of about 1.4 to about 2.5.

In its most preferred form, the smaller selected value J lies in a range [6,7] and the second selected value K lies in a range [18,24]. Standard mathematical notation for the range is used in this specification. Thus, a statement that an integer lies in a range [a,b] means that that particular integer value is an integer that is greater than or equal to a and less than or equal to b. It should be understood that the above referenced statement with respect to preferred ranges is a generalization for some familiar conventional fonts used to display text. The selection of appropriate values for parameters J and K is strongly font dependent. Generally, the best results will be achieved for bold fonts (i.e., those tending to have wide glyph strokes) with smaller values of J and K. The best results will be achieved for like fonts (i.e., those tending to have thin glyph strokes) when higher values of J and K are employed.

In applications in which P will not be less than a first selected value J, for such occurrences will be very rare, it is within the scope of the present invention to always perform the grid fitting hinting process and select either scan conversion at a physical pixel level outputting maximum or minimum grayscale values, or alternately subdividing the physical pixels into subpixels and performing a conventional grayscale rendering with weighted grayscale outputs. The selection of one of the alternative scan conversions in this case depends on the relationship between the character height value P and the selected value of K.

Therefore, it is an object of the present invention to provide an improved method of displaying characters on physical pixel oriented devices having more than two intensity levels for each pixel.

It is a further object of the present invention to provide a method of displaying characters on pixel oriented grayscale display devices wherein the characters are described by geometric descriptors in preexisting font descriptions that were designed for fonts displayed on binary (i.e., two level) pixel oriented display devices.

It is a further object of the present invention to provide a method of displaying characters on grayscale pixel oriented devices at low resolution that takes full advantage of the dynamic range of the grayscale device while counteracting geometric distortions that exist in hinting instructions in a large number of existing font descriptions when characters are displayed with low resolution.

It is still a further object of the present invention to provide a method of displaying characters on a grayscale pixel oriented device that employs grid fitting hinting when the resolution at which a character is to be displayed is sufficiently large and selects either a binary conversion or a multi-level grayscale conversion as a function of the height of the displayed character in physical pixels.

It is still a further object of the present invention to provide a method of displaying characters derived from conventional font descriptors that allows the user to select predetermined selected values against which the height of the displayed character space, in physical pixels, is compared, to select whether grid fitting is to be employed and to select the particular type of scan conversion to be employed. It is still a further object of the present invention to allow a font designer or an application employing this method to select out of range values that easily defeat the operation of this method in a computer when desired, without affecting its availability for other applications running on the same computer.

That the present invention achieves these objects and fulfills the need described hereinabove in the Background of the Invention will be appreciated from the detailed description of the preferred embodiment to follow.

BRIEF DESCRIPTION OF THE DRAWINGS

FIG. 1 is a representation of a glyph of a lower case m that is unhinted and superimposed on a low resolution pixel grid.

FIG. 2 is a fragmentary view of a generalized glyph stroke with a relatively common form of hint shown in phantom.

FIG. 3A illustrates the activated or illuminated pixel result of a scan conversion of the unhinted glyph stroke of FIG. 2 using binary or bilevel pixels.

FIG. 3B illustrates the illuminated pixel result of a scan conversion of the hinted glyph stroke of FIG. 2 using bilevel pixels.

DETAILED DESCRIPTION OF THE PREFERRED EMBODIMENT

Figure 4:
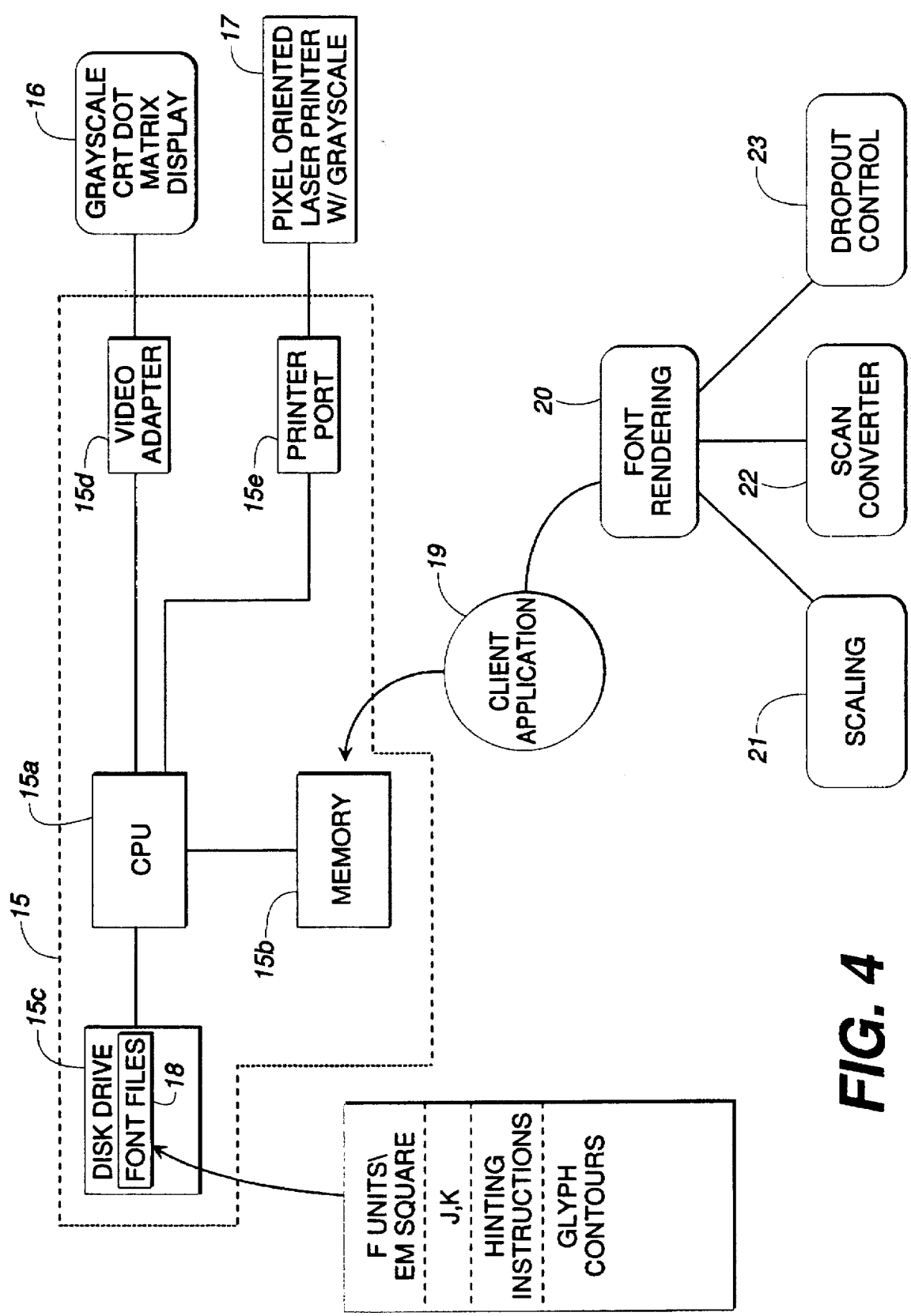
FIG. 4 is a block diagram of a typical computer system that embodies the system of the present invention and executes the steps of the method of the present invention.

Turning next to the drawing figures, the preferred embodiment of the present invention and its effects on displayed characters will now be described. Turning first to the nomenclature of the specification, it is well known to those skilled in the art that the principles of pixel oriented displays apply to both high intensity active light generating devices, such as CRT displays, and light absorbing or blocking devices such as dot matrix printers and back lit LCD displays. Thus, it should be understood that the notion of pixel intensity as used in this specification refers to the intensity of activation of a pixel. Thus, a high intensity pixel on a display device described in this specification would physically be embodied by a bright pixel on a CRT display and a dark or dense pixel on an output from a pixel printer. For color output from a printer, a high level of intensity refers to a dense deposit of toner or a high level of saturation for the color in use.

Additionally, as noted hereinabove, grayscale level refers to a multiple level dynamic range for the pixel output in question. Thus, it is not limited to monochrome or black rendering of pixels but generally refers to intensity of a pixel, and can refer to overall intensity of a composite color in either additive or subtractive color display devices.

The present invention was designed to work in the environment of, and as a part of, an image processor for handling True Type font descriptions. However, its applicability is not so limited. This specification makes reference to conventions for True Type font descriptions and processes for converting same that are known to those skilled in the art. However, the generic nature of these steps will be recognized by those skilled in the art and their application to methods for rendering fonts maintained in other descriptive formats will be apparent.

Figure 7:
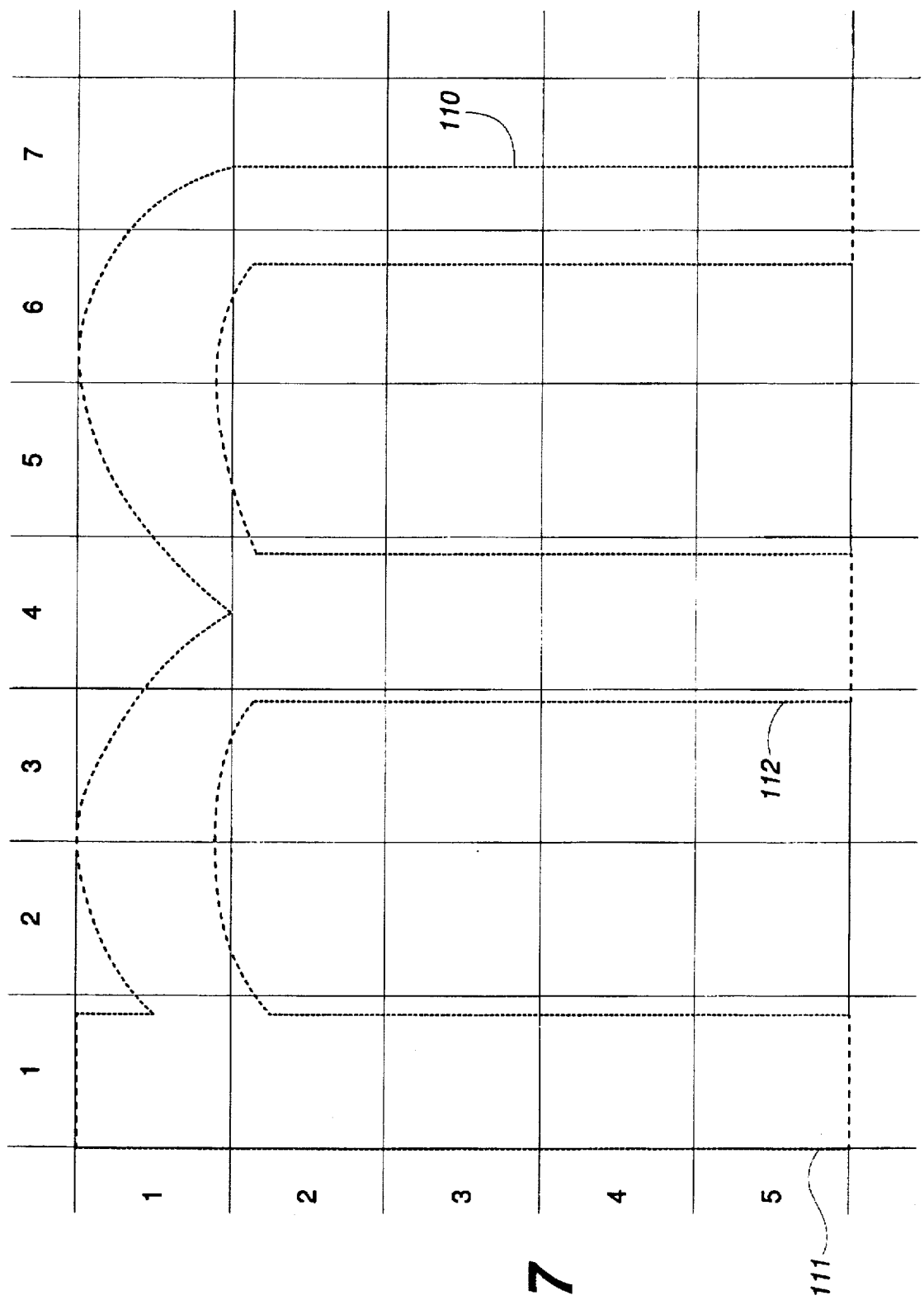
FIG. 7 illustrates super sampling at the subpixel level of the glyph of FIG. 1 for a low resolution display in accordance with the preferred embodiment of FIG. 6.
Figure 8:
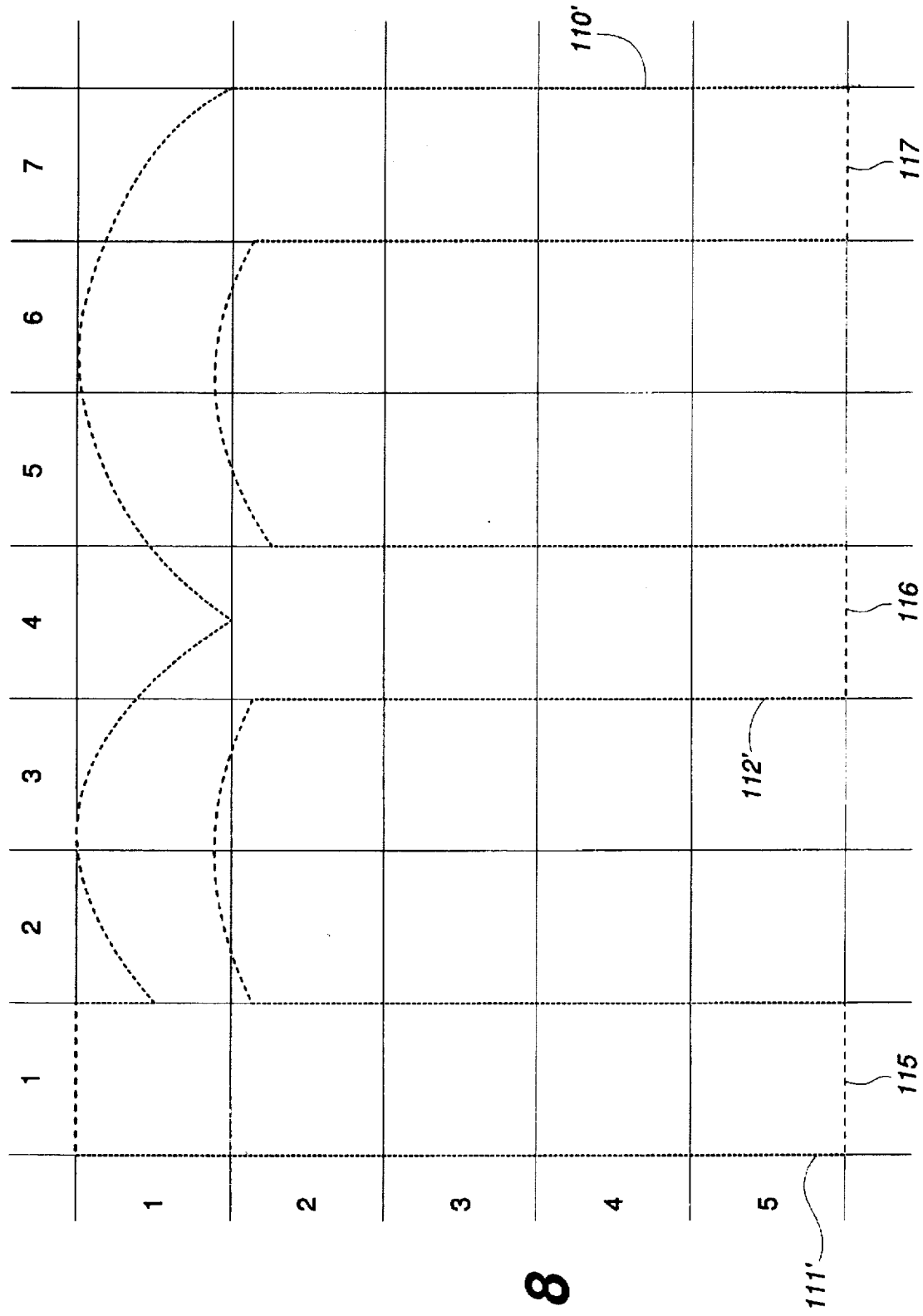
FIG. 8 is an illustration of a super sampled grid used in a subpixel scan conversion for a grid fitted glyph for the character of FIG. 1.

With that preface, the present invention will now be described. FIG. 1 shows a lower case "m" character superimposed on a background of a relatively low resolution pixel grid. The character is contained in a grid space with five rows by seven columns of physical pixels. In FIGS. 1, 7 and 8, physical pixels are numbered by rows 1-5 and columns 1-7. This convention is retained consistently throughout this specification.

References to the pixel grids of FIGS. 1, 7 and 8 refer to pixels by an ordered (row, column) pair. Thus, the pixel in the uppermost left hand corner is designated as pixel (1,1). The pixel in the top right corner is designated (1,7). The character illustrated in FIG. 1 shows a dashed line indicated at 30. In the convention of True Type fonts, as well as other font description conventions, the geometric descriptor of a glyph consists of one or more contours, i.e., lines that define boundaries of the glyph. The contours proceed in a forward direction with areas that lie to the right of the direction of travel along the contour being those that are filled in order to display or print the glyph. Arrowheads appear at several places in FIG. 1 showing the direction of progression of points for this glyph descriptor. This follows the True Type convention, noted hereinabove, where the series of on-boundary points and off-boundary points are numbered sequentially so that tracing a path through the points always leaves the filled or activated area for the glyph to the right of direction of travel. This character features three stems 31-33.

Those skilled in the art will recognize that the character of FIG. 1 needs some hinting prior to display at the relatively low resolution illustrated in FIG. 1, assuming that the system in question activates pixels only if the center of a pixel would be "covered" by a glyph stroke. This is the case with the scan converter employed in the Microsoft Windows™ operating system as well as many other font rendering systems. In particular, stem 33 and splines 34 and 35 will be acceptably rendered by turning on all of the pixels in column 1, the pixels in column 4 at rows 2-5, inclusive, and pixels (1,2), (1,3), (1,5), and (1,6). However, the entire right hand stem 33 will be lost in a typical scan conversion as the centers of all of the pixels in column 7 lie outside the boundary 30 of the glyph descriptor. This is clearly an unacceptable result for rendering the character on a bilevel physical display device and hinting is required in order to make the character appear readable when displayed on a device having the illustrated pixel size. We will return to this character in connection with the discussions of FIGS. 7 and 8 later in this specification.

Prior to proceeding with the description of the present invention, it is noted that FIGS. 2-3B illustrate some of the phenomenon described above in the Background of the Invention. FIG. 2 shows a generalized fragment 37 of a glyph stroke for any character having such a feature. Employing a conventional scan converter to render this fragment on a bilevel pixel display leads to the result illustrated in FIG. 3A. Since the center of pixel (1,3) is uncovered, pixel (1,3) remains off in FIG. 3A. Assume for the moment, as is often the case, that the font designer believes that the filled corner for this glyph stroke that is illustrated in FIG. 3B is a preferable rendering at low resolution. In FIG. 3B, it can be seen that pixel (1,3) is on.

A common approach, described hereinabove, for font designers rendering such a glyph stroke is to include hinting instructions in the True Type descriptor that indicate that the glyph descriptor should be moved to follow the path illustrated by dashed line 38 in FIG. 2, at least when the font is rendered for display on a low resolution device. While it might be more artfully done to round the edge of dashed line 38, making sure that the path passes just to the outside of the center of pixel (1,3), it is easier for the font designer to simply pull the glyph boundary description up toward the corner of the pixel. Indeed, for a low resolution two level pixel display device, there is no difference in the resultant display of the character.

However, there is a difference in the resultant display if an appropriate scan conversion is done for displaying this glyph stroke in a pixel oriented device having a dynamic grayscale range of, for example, 4 to 16 levels. Note that part of pixel (1,3) is covered by the outline of glyph stroke 37 and thus, a well done scan conversion for grayscale output will cause pixel (1,3) to be illuminated to a relatively low level. It should also be apparent that a grayscale conversion for a well rounded hint that would cut the corner just outside the center of pixel (1,3) would lead to a lower grayscale value for the output of pixel (1,3) than the actually employed hint illustrated by dashed line 38.

It is not the purpose of this specification to fault font designers for specifying hints in this fashion. Indeed, it made complete sense in the context of the environment in which they were working, i.e., scan converters for turning on and off physical bilevel pixels. However, this illustrates the sort of problems that do arise if the only change in methodology of font rendering that is made is to employ a display device having grayscale capability and doing a grayscale level conversion on existing font descriptions. The value of and power of the grayscale capability to smooth discontinuous edges and make them appear more rounded to the viewer can be destroyed by hinting instructions that were made with two level displays in mind.

FIG. 4 shows a typical computer embodying the system of the present invention, and which executes the steps of the method of the present invention. The components typically comprising the computer are surrounded by dashed line 15. Within the computer are a central processing unit (CPU) 15a, to which system memory 15b is connected. A disk drive 15c is also connected to the CPU so that data can be transferred back and forth between disk drive 15c and memory 15b.

A video adapter 15d and a printer port 15e are also connected to the CPU. In embodiments of the present invention, the video adapter 15d is of the type with video memory arranged so that it can control a grayscale CRT dot matrix display device 16 that is attached to the adapter. Attached to printer port 15e is a pixel oriented grayscale laser printer 17. Those skilled in the art will appreciate that display 16 and printer 17 are two examples of grayscale display and printing devices that may be used with embodiments of the present invention.

Stored on disk drive 15c are font files 18. As indicated in detail on FIG. 4, typical font files include specifications of the number of FUnits for the em square. Also stored in the font file are specifications for control parameters J and K that are discussed in further detail hereinbelow. Parameters J and K may be omitted from a font file, as they generally will be for preexisting fonts designed to be rendered on bilevel or binary pixel oriented devices. Furthermore, values for J and K may be specified explicitly, or implicitly by specifying values of J and K for particular ranges of the number of physical pixels spanning the vertical portion of a character space during the rendering process.

Hinting instructions, if provided by the font designer, are also stored in the font file. The main body of the font file consists of the glyph contours. As described hereinabove in connection with FIGS. 1-3B, the glyph descriptors consist of sets of contours that are defined by a sequence of on-boundary and off-boundary points. The contour itself is the boundary, and the points, specified in the FUnit coordinates in the em square, define the path of the contour(s).

The basic program elements used to embody the present invention are illustrated as residing within memory 15b. First, a client application 19 represents an application program running on CPU 15a under the Microsoft Windows™ operating system in the preferred embodiment. When this application needs to display or print characters or other glyphs in a particular font, it requests the service of rendering a particular font from font rendering routine 20.

The font rendering routine 20 calls various routines used in the rendering process. Scaling routine 21 takes information including the number of FUnits in the em square, the requested character size from client application 19, and the resolution in pixels per unit length of the device upon which the characters will be displayed or printed, and uses these to scale the coordinates of the points of the glyph descriptors. As the points defining the contours of each glyph are provided to scaling routine 21, it performs a coordinate conversion from the coordinate system of the em square in FUnits to physical pixel coordinates for the character space on the display or printing device, for example, display 16 or printer 17. In the preferred embodiment, scaling routine 21 also has the capability of scaling the glyph descriptors to subpixel coordinates for use in grayscale rendering.

Figure 5:
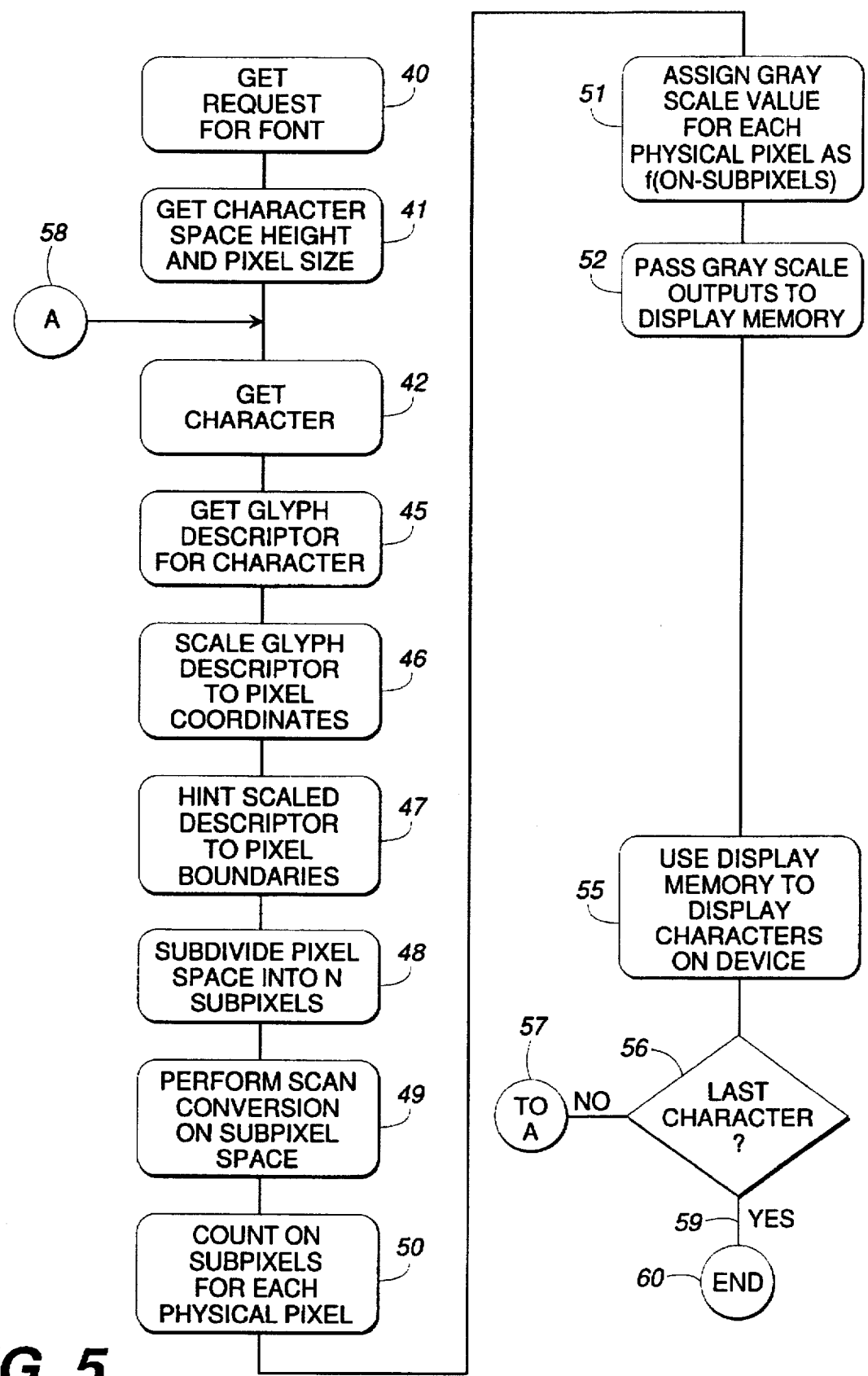
FIG. 5 is a flow diagram of the basic combination of grid fitting and grayscale conversion that constitutes an embodiment of the present invention.
Figure 6:
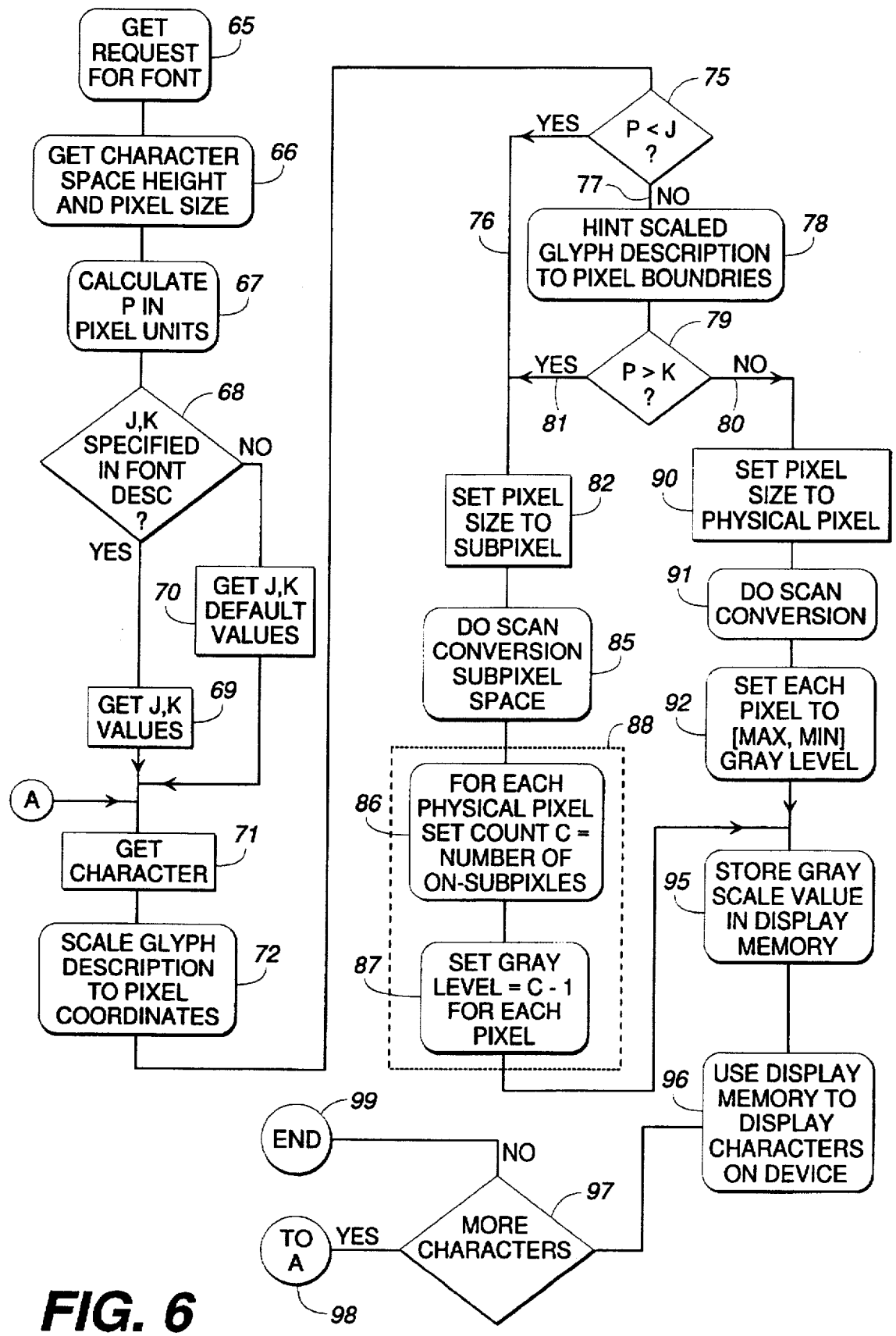
FIG. 6 is a logical flow diagram of the preferred embodiment of the method of the present invention.

Rendering routine 20 also calls scan converter routine 22 which performs conventional scan conversion at either the pixel or subpixel level to determine which pixels or subpixels should be designated as turned on or turned off when the character is rendered. The scan conversion routines employed in the present invention are per se in the prior art. If employed, dropout control routine 23 can be used after conventional scan conversion to address potential problems of pixel dropout. FIGS. 5 and 6 relate to two embodiments of the font rendering routine 20 illustrated on FIG. 4. They reference calls to routines 21 through 23 and use of information stored in font files 18.

With that background, the reader is directed to FIG. 5 in which the basic method of the present invention is illustrated as one embodiment. FIG. 5 illustrates a basic embodiment of the present invention. When a client application makes a request for a font, appropriate parameters of the request are obtained and each character is converted by using conventional scaling and hinting procedures. Subsequently, the scaled pixel space is subdivided into subpixel space and a scan conversion is performed on the glyph descriptor with respect to the coordinates of the subpixel space. The number of subpixels that are indicated as on subpixels (i.e., those that are activated by the scan conversion process) are then counted for each physical pixel and an appropriate grayscale level is assigned to that physical pixel, based on the count. The grayscale levels are stored in memory and the process is repeated until all glyphs of the font have been rendered.

The procedure begins with getting a request for a font from an application running on the computer system at routine 40. Next, the method gets a character height and pixel size from its client process at step 41. The character height is a convention used to define the physical size of the character space on the display device that will be utilized to display these characters. It provides information that is equivalent to the physical point size of the output. The pixel size will be well recognized as the physical pixel resolution of the device that is employed, and normally expressed in pixels per inch. Those skilled in the art will recognize that, from this information, the process determines the number of physical pixels that will be occupied by the character space allotted to a displayed character.

Next, a loop is entered that begins converting all characters of the character set for the font being rendered. The first character is fetched at step 42 and the process gets the glyph descriptor for that particular character from the font description file at step 45. Next, the glyph descriptor is mathematically scaled from its font unit description to physical pixel coordinates at routine 46. Following this, the scaled descriptor is grid fitted, or hinted, to the physical pixel boundaries at routine 47.

Those skilled in the art will recognize that steps 40-47 are conventional in nature and describe the initial steps of a prior art True Type font rendering process and other similar font rendering processes. In the prior art, hinting the scaled descriptor to pixel boundaries is normally done for low resolution displays and is under the control of the font designer for True Type fonts.

Next, the process subdivides each physical pixel in the physical pixel coordinates into N subpixels at routine 48. It is clearly preferable to select N to be an integer power of 2. In most all applications, N will be equal to the number of grayscale levels supported by the device upon which the characters are to be displayed. Thus, it is desirable to have $N=2^n$ where n is an integer. For example, for an eight level grayscale device, N=8 and n=3. For N=64, n=6, etc. Since n will be equal to the number of bits required to store a grayscale value, n=4 and n=8 are memory efficient expedients if the physical output device supports an appropriate dynamic range.

After the pixel space is subdivided into subpixels, a conventional scan conversion is performed at routine 49 on the scaled glyph descriptor in subpixel coordinates, i.e., in subpixel space. The scan conversion is preferably implemented by simply employing existing bilevel pixel scan conversion techniques. Thus, the scan converter can use conventional rules in converting the subpixels, such as any subpixel whose center is covered will be an on subpixel and otherwise it is an off subpixel. Other rules can be used, such as any subpixel that is intersected at all by the glyph stroke will be turned on. The preferred embodiment employs the more conventional scan conversion rule of turning on subpixels whose centers are covered and otherwise turning (or leaving) them off.

Thus, at routine 49, a bit map having a number of bits equal to the number of subpixels in the field of the scan conversion is created, and bits are set or cleared according to the output of the conventional bilevel scan conversion process. Note that it is simpler to subdivide the entire character space into subpixels and assign one bit for each subpixel in the character space to be used to store output in the scan conversion. However, it is only necessary to subdivide the pixels and perform the scan conversion for any physical pixels through which any portion of a glyph stroke passes. Thus, it is within the scope of the present invention, but not considered preferable at the present time, to limit the subdividing of the physical pixels to only those pixels that are intersected by the filled area of the grid fitted scaled glyph descriptor.

At routine 50, the bit map from the scan conversion in subpixel coordinates is converted to grayscale levels for respective physical pixel coordinates. The preferred embodiment of the present invention employs a simple expedient of counting the number of subpixels that were "turned on" by the scan conversion of routine 49. It should be noted that there is no physical subpixel to be "turned on". What actually happens is that the process for activating physical pixels is performed on the space that is mathematically divided into subpixels and memory locations are set to a particular logical value to indicate that a subpixel would be turned on if it were a physical pixel in a display device for which the scan conversion was being performed. It thus becomes designated as an on subpixel in the subpixel level scan conversion process.

When the number of subpixels has been counted, this is used to generate a grayscale value for the physical pixel as a function of the number of on subpixels counted at routine 50. This process is shown at routine 51 in FIG. 5. For any N level grayscale output device, there are N possible intensity values. Since one of these is the pixel being off, i.e., a grayscale value of 0, it is conventional to designate the grayscale values as lying in the range $[0,(2^n-1)]$. Thus, for N subpixels under these circumstances, it is preferable that two of the counts map into one of the possible values. For example, a count of one subpixel can be mapped to a 0 level in most devices without impacting the perceived quality of the output. Consider an example where n=6 and N=64. Once counting of pixels is accomplished, a simple rule for assigning a grayscale value at routine 51 is to assign a 0 grayscale value if count C=0, and otherwise to assign the grayscale value to be C−1. Thus, the resulting range of grayscale values will be [0,63], which is conveniently stored in six bits.

It should be noted that routines 48–51 are, per se, an example of a known method of grayscale rendering of an arbitrary geometric shape for display on a grayscale device. For example, such a method is described in "Principles of Interactive Computer Graphics" by Newman and Sproull (McGraw Hill, 1979) at page 237. The combination of grid fitting character fonts and employing grayscale rendering of the grid fitted fonts that provides nonobvious improved results, when used with existing conventional font descriptors.

It should also be noted that the grayscale rendering illustrated in routines 48–51 on FIG. 5 is considered the best mode of grayscale rendering by the present inventors in the application of a computer system for driving display devices. Its principle advantage is that it utilizes existing, relatively optimized, routines for rendering output on bilevel pixel display devices. The counting process of routine 50 is preferably accomplished in a lookup table. Efficient iterative lookup table processes for shifting portions of the bit map and generating an output proportional to the number of bits that are on already exist and are known to those skilled in the art.

However, the preferred method of employing grayscale rendering described hereinabove should not obfuscate the more general nature of the method steps illustrated at routines 48–51. In order to practice the present invention, it is only necessary that a grayscale rendering routine be employed on the grid fitted scaled glyph descriptor that results as output from routine 47. For example, any physical pixel that is partially covered by a glyph stroke could be geometrically analyzed to determine the fraction of the pixel's area that is covered by the glyph stroke. This could be directly converted to the nearest grayscale value without subdividing the physical pixels into subpixels as described in the preferred embodiment. Therefore, it is preferred to perform steps 48–51 to provide a grayscale value for each physical pixel that is a function of the fraction of the pixel covered by a glyph stroke, but any set of steps that performs a reliable grayscale rendering based on the portion of the physical pixel covered by a glyph stroke may be employed as an equivalent set of steps.

The preferred form of conversion of the count of on-subpixels is to employ gamma correction. Thus, the gray level output is a function of the percentage of illuminated subpixels raised to a positive exponent greater than 1. However, any relationship may be used in embodiments of the present invention, although the inventors also believe it is important that the relationship between the number of on-subpixels and grayscale level output be monotonic.

Once routine 51 is completed, the grayscale values for each pixel position are output to the display memory at routine 52. Thus, the display memory now contains a pixel map of the first character with n bits per pixel position for a N-level grayscale output device.

The Microsoft Windows™ operating system is the environment for which the preferred embodiment was designed, and it uses the display memory to display characters on the particular physical device under consideration. The use of data from the display memory to display characters on a physical device is indicated at routine 55 on FIG. 5. Next at decisional step 56, the method tests to see if the last character in the character set for this font has been processed. If it has not, the NO branch is taken to node 57 that branches the program back to node 57 from which the process gets the next character in the character set at step 42 and repeats the above described process. This loop is sequentially executed until the last character is processed and decisional step 56 provides a true output. When this occurs YES branch 59 is taken from step 55 and the process passes control back to its client system, as indicated by END node 60.

From the foregoing it should be appreciated that this process, like prior art character rendering processes for pixel oriented display devices, may be intuitively considered as dynamic creation of specialized character generators. The preferred embodiment has the following advantageous features. It allows the existing font descriptions to be elegantly and efficiently transferred to the environment of a grayscale output device. This transfer is accomplished in a manner that overcomes a problem creating what one of the inventors describes as weird lumpy looking fuzz if conventional and existing font descriptions are simply applied to a system where a grayscale display device is simply substituted for a bilevel display device. It takes advantage of existing bilevel (i.e., one bit) scan conversion routines and efficient existing lookup table counting schemes for counting the numbers of on-subpixels that result from the scan conversion in subpixel coordinates.

The preferred embodiment of the present invention, which is most useful in practical applications, is illustrated in FIG. 6. This aspect of the invention has been made by the present inventors in response to discovery of the source of distortion problems that resulted from application of existing font descriptions to systems driving grayscale level display devices.

In this embodiment, values for parameters J and K are obtained from the font description. If none are present, default values are employed. When the font request is received, which request includes information on the resolution of the physical device to be used, a character space height, P, in physical pixel units is calculated. The characters are then scaled in a conventional fashion. Subsequent use of hinting and alternative scan conversion routines are determined by the relationship between the character space height parameter P and the controlling parameters J and K. In particular, the parameter J controls whether hinting will be employed in rendering the glyphs of the font. Parameter K determines whether the scan conversion will take place in physical pixel coordinates or subpixel coordinates and thus, whether the resulting display will be bilevel or grayscale, respectively.

As with the embodiment of FIG. 5, the process starts with receipt of a request for a font by an application at step 65. At step 66 the character height in font units or FUnits and the physical pixel size for the output device are obtained at step 66. At step 67 a character height value P in physical pixel units is calculated from these values and thus represents the height of the character in physical pixels for the device upon which it will be displayed or printed. Naturally, P represents the number of physical pixels that span a single character space on the output device in the vertical direction. Embodiments of the present invention may be constructed using any other appropriate indicia of the resolution of the particular display device when displaying a single character at the requested character physical height.

Next, the process moves to decisional step 68 at which a font specification stored in the font specification file is read to see if selected values J and K are specified in that font specification or description file. J and K are parameters used in the present invention that, once specified, determine whether a particular rendering of a font will employ grayscale or bilevel scan conversion and whether hinting will be used. In the method of the preferred embodiment, these parameters are compared to a character space height parameter, P, that equals the height of the rendered character space (i.e., the em square) in physical pixels on the display or printing device in use. J and K must each be positive integers and J must be less than or equal to K, and is preferably less than K. The physical significance of J and K, and the criteria by which they are selected are discussed hereinbelow. At this point in the description, it should be understood that they are simply positive integers having the above characteristics that are used for subsequent decision making purposes.

If a specification of J and K values is found in the font description file, these values are retrieved by the process at step 69 and used for the remainder of the process. If they are not present, default values of J and K established by the process itself are retrieved and used at step 70. Step 69 allows for two possibilities of specifying J and K in the preferred embodiment. The font designer may specify specific values for J and K to be used in rendering the font on grayscale output devices. Alternately, and the inventors believe preferably, the font file may specify ranges of the number of pixels occupied by the character space, i.e., ranges for P, and provide specific values for J and K associated with these ranges. When this has been completed, the character space height value P is known and selected values J and K have been loaded into appropriate memory locations in the computer performing this process.

It should be noted that character height value P is, in general, a normalized variable in that it is an expression of the height of the characters to be displayed in physical pixels that is specific to this particular device and this particular requested character display height.

However, it should be noted that P will be the same number for a relatively wide variety of physical character heights, depending on the resolution in pixels per unit length of the display device employed. Thus, a 12 point character displayed on a 300 dots per inch laser printer will have the same value of P that is generated by a request to display a 50 point character on a 72 dots per inch CRT display. Currently, it is believed by the inventors of the present invention that selection of fixed values for J and K, independent of character height, based on geometric characteristics and aesthetic considerations for the particular font being rendered is the preferable approach. It should be noted that the present invention is designed to accommodate the technique known as optical scaling, which is commonly used by typographers. Optical scaling refers to the process of non-linear expansion or contraction of the geometry of characters in a font depending on the point size at which the characters will be displayed or printed. This technique is used to maintain readability and perceived consistency of font characteristics. True Type font descriptions allow for different glyph descriptors to be provided, depending on the point size requested in the call for the font. Thus, different values for J and K may be provided for the different descriptors in order to obtain the best results in fonts where optical scaling techniques have been employed.

Returning to the illustration of the preferred embodiment in FIG. 6, the first character is obtained at step 71 as was the case with the previously described embodiment of this invention. The geometric glyph descriptor is then scaled to provide a scaled geometric descriptor in physical pixel coordinates as a function of the physical pixel size and the requested character height at routine 72. This is the same routine as illustrated at routine 46 in FIG. 5.

At this point, decisions based on the relationship among P, J, and K are made to determine the pixel rendering steps that will be performed. At decisional step 75, the value of P is compared to see if it is less than the smaller of the two selected values, J. Since J is the smaller of the two selected values, it can be seen that a true result of step 75 leads to branch 76 under conditions in which the value of P is less than the lowest value of interest defined by J. It will be recognized that this describes a situation in which there are a relatively small number of pixels available in the character space and thus, we are processing a low resolution display of the character. Branch 76 leads to step 82 and will be described momentarily hereinbelow.

If NO branch 77 is taken from step 75, the physical space on the display device for displaying a character is more than J pixels high. When this circumstance is detected, the scaled glyph description is grid fitted to physical pixel boundaries at routine 78. This is the same routine that is performed at 47 in the embodiment of FIG. 5. Proceeding from routine 78, decisional step 79 is performed to test whether the value of P is greater than the second and larger selected value, K. If it is not, NO branch 80 is taken to a set of steps that are executed when P is greater than or equal to J and less than or equal to K. These will be described momentarily hereinbelow.

First, consider the case in which YES branch 81 is taken from step 79, indicating that the value of P is greater than K. It will be apparent that this represents circumstances in which each character is to be displayed with a relatively high resolution since the character is more than K pixels high on the physical device upon which it is to be displayed.

Therefore, both branches 76 and 81 lead to step 82, which leads to a series of steps that are functionally identical to steps 48–51 in the embodiment of FIG. 5. A scan conversion is performed at routine 85 based on the subpixel coordinates that are selected in the same manner as those at steps 48 and 49 in the embodiment of FIG. 5. Next, routines 86 and 87 are performed which, collectively, are designated within dashed line 88 in FIG. 6. Steps 86 and 87 count the number of on-subpixels in each physical pixel at routine 88 and set a grayscale level equal to the count minus 1 at step 87. Thus, block 88 represents any arrangement for deriving a grayscale value for the physical pixel from the bit map that results from the scan conversion of the subpixels at step 85.

It should be noted that step 82 is reached through step 78 in the case of relatively high resolution display (P>K) and is reached by bypassing step 78 for low resolution situations (P<J). Thus, when P is less than J, no hinting is performed and the scaled glyph descriptor, in physical pixel space, is directly grayscale rendered without fitting it to the physical pixel space. When this set of steps is executed, any hinting instructions included by the font designer in the font description are ignored.

Next, consider the case in which the value of P is intermediate the range of J and K, i.e., when step 80 is taken from decisional step 79. This means that the value of P is greater than or equal to J and less than or equal to K. It should be noted here that equality could be part of the logical operator at either step 75 or 79 (or both) without departing from the scope of the present invention. Thus, if the value of J is equal to a given integer a, step 75 could also be equivalently expressed as determining whether P is less than or equal to a-1. The important aspect of the present invention is that the value of P be compared to two selected values, and not whether the conditions of equality fall in the middle range or on either of the outer ranges in the actual comparison process performed by a computer that performs the method of the invention.

NO branch 80 leads to step 90 at which the pixel size for scan conversion is set to the physical pixel size. Then a conventional scan conversion is performed at routine 91. The scan conversion routine 91 is a conventional bilevel scan conversion for determining whether to turn on particular physical pixels. This should be contrasted with the mathematical scan conversion of the subpixel level performed at step 85 on the left hand branch of FIG. 6. This when scan conversion 91 is completed, its output is a bit map for the hinted (i.e., grid fitted) scaled glyph descriptor that is the same as that employed in the prior art for bilevel pixel display and printing devices. Thus, in the scan conversion performed at 91, it is preferable to include any dropout control that is desirable under the circumstances in the same manner as one would when performing a scan conversion for a bilevel device.

At routine 92, each physical pixel is rendered in a bilevel output by setting the gray level for that pixel to either a maximum intensity value or a minimum intensity value, i.e., off. Thus, it will be appreciated that for requests to display characters in a particular height on a particular physical device for which P is greater than or equal to J but less than or equal to K, the scaled-glyph descriptor is first grid fitted, and then scanned in a manner that is fully equivalent to a conventional bilevel scanning. The only change that needs to be made to accommodate the use of a grayscale display device is to expand the bit map that results from the scan conversion at step 91 into maximum or 0 gray values. These values are then stored in the display memory storing the values for this particular character, of this particular font, rendered for display at the given height on the particular display device.

All hinting and scan conversion paths lead to routine 95 at which the grayscale values generated are stored in the display memory. Process 96 employs the grayscale values in the display memory to actually display characters on the physical device. Decisional step 97 then tests to see if all characters of the font's character set have been converted and either loops back via the YES branch 98 to convert the rest of the character set for this font, or exits via the NO branch to END node 99.

The inventors of the present invention have experimented with existing font descriptions and various grayscale devices, particularly concentrating on CRT displays with grayscale pixels. As of the time of writing this specification, the inventors believed that the preferred range of values for selected value J is the range [6,7]. They likewise believe that the preferred value of K is in the range [18,24]. These values should not be taken as limiting of the scope of the present invention, but only as an indication of the inventors subjective belief, based on their experience as of the time of filing this specification, as to what constitutes the best mode of the present invention.

The criteria for selecting the value of J generally depends on the space available within the em square (i.e., the character space) to render alphabetic characters. Thus, fonts with bolder strokes in the alphabetic characters that tend to fill more of the em square are more appropriately rendered with lower values of J than fonts with alphabetic characters having finer strokes.

It should also be noted that the expedient of allowing the font designer to specify values for J and K that are fetched at step 69 allows the font designer the option of defeating the employment of the method of the present invention when circumstances warrant. J and K can be set to either extreme values, or values calculated based on the value of P, in order to control operation of an image processing system employing the method of the present invention. For example, setting both J and K equal to 0 will cause the process illustrated in FIG. 6 to always traverse a path through branches 77 and 81 so that the scaled glyph descriptor will always be grid fitted and always converted using the subpixel grayscale rendering. This could be useful in the future as font designers become more skilled at designing fonts that may have serifs and stems grid fitted but do not employ other distorting hints of the type that have been previously employed to control dropout. In other words, as font designers become more accustomed to designing fonts for grayscale devices, they may wish to specify that their fonts are always grid fitted and grayscale rendered.

Similarly, a font designer could force a computer performing the method of the present invention to always grid fit the scaled glyph descriptor and perform the equivalent of a bilevel pixel conversion by setting J equal to 0 and K equal to a very large number that is not likely to be encountered as a value of P in practical applications.

Additionally, a special case of setting J=K can be used to obtain the following results. If this is the case, a value of P that is less than then value of J and K leads to the grayscale conversion that proceeds from branch 76 in FIG. 6. If the value of P is greater than the value of J and K, then the glyph descriptors are hinted at step 78 and then the same grayscale conversion is used. Therefore, setting J=K eliminates the possibility of bilevel pixel display or printing.

The major effects of employment of the present invention have been described verbally hereinabove. However, some will be briefly illustrated in connection with FIGS. 7 and 8. FIG. 7 is an expanded view of the character of FIG. 1 shown on an expanded scale with each pixel being divided in to 64 subpixels. In other words, n=6 and N=64 for a subpixel scan conversion used in rendering this character. The same convention of identifying a pixel as a row column pair, (a,b), that was employed in connection with FIGS. 1–3B is used here.

As can be seen in FIG. 7, the value of P will be relatively small in the example illustrated. This is a low resolution situation. Note that the right hand stem, indicated at 110 is less than one pixel wide when scaled to physical pixel coordinates. The rendering of this character at this size on a particular display device having pixels of the size illustrated will be one for which P is less than J. Therefore, the scaled glyph descriptor will not be grid fitted and a grayscale rendering per steps 82–87 in FIG. 6 will be performed. This will result in output that has the following characteristics. The left hand stem on 111 will have a bright boundary on its left hand edge since this edge corresponds to a physical pixel edge and the pixels in column 1 have most of their subpixel centers covered. Pixels (1,2) and (1,3) will be illuminated to similar intensities as those in column 1.

The middle stem 112 is slightly offset with respect to the pixel boundary and thus, its left hand boundary will be slightly fuzzier due to low level illumination of pixels (2,3) through (5,3) proceeding down column 3. The body of center stem 112 will be brightly illuminated due to the covering of the substantial majority of subpixels in pixels (2,4)–(5,4) in column 4.

Note that pixel (1,4) will be illuminated to a level less than half intensity. This will have the visual effect of suggesting the depression that appears over center stem 112 in the glyph descriptor when viewed by the human eye. Pixels (1,5) and (1,6) will have intensities similar to those in columns 2 and 3 for row 1.

The right hand stem 110 will be somewhat dimmer and will appear a bit fuzzier than the left hand stem 111. This is in part appropriate because the glyph descriptor shows a narrower stem on the right than the left.

The foregoing description, together with the values in the following Table 1 illustrate the principal effects of use of the present invention.

TABLE 1

| Row | Column | | | | | | |
|---|---|---|---|---|---|---|---|
| | 1 | 2 | 3 | 4 | 5 | 6 | 7 |
| 1 | 60 | 51 | 49 | 19 | 48 | 56 | 11 |
| 2 | 58 | 3 | 8 | 57 | 2 | 17 | 24 |
| 3 | 56 | 0 | 8 | 56 | 0 | 16 | 24 |
| 4 | 56 | 0 | 8 | 56 | 0 | 16 | 24 |
| 5 | 56 | 0 | 8 | 56 | 0 | 16 | 24 |

FIG. 8 shows the same character of FIGS. 1 and 7 after having been hinted by grid fitting. In one sense, it is an inappropriate example because it is used to illustrate the high resolution case of P being greater than K while the illustrated resolution, in physical pixels per character space, is less than would be considerably less than K in most preferred forms of the present invention. However, it provides an indication of the subjective results when both hinting and grid fitting are employed per the P>K case of the embodiment of FIG. 6 or the embodiment of FIG. 5.

In FIG. 8, left hand stem 111' has been grid fitted to cover the pixels in column 1. Similarly, the middle stem 112' has been grid fitted so that it covers none of the subpixels of the pixels in column 3 and completely covers pixels in column 4. The right hand stem 110' has been distorted by expansion when grid fitted to the boundaries of the pixels in column 7. In the illustrated embodiment, the left hand arch has simply been translated by approximately one subpixel where there has been a slight expansion of the right hand arch between middle stem 112' and right hand stem 110'. All of the stem boundaries and the boundaries of serifs 115, 116 and 117 are at the boundaries of physical pixels. They are also at the boundaries of physical pixels that are displayed with maximum intensity and are juxtaposed (in most cases) to pixels that are off.

Pixel (1,7) will be illuminated to approximately half intensity which will create the visual impression of a relatively smooth curve. Resulting values of the number of subpixel centers covered, and thus the number of on subpixels that result from the scan conversion of step 85 (FIG. 6) are shown in the following Table 2.

TABLE 2

| Row | Column | | | | | | |
|---|---|---|---|---|---|---|---|
| | 1 | 2 | 3 | 4 | 5 | 6 | 7 |
| 1 | 64 | 51 | 57 | 22 | 49 | 58 | 34 |
| 2 | 64 | 2 | 1 | 64 | 4 | 1 | 64 |
| 3 | 64 | 0 | 0 | 64 | 0 | 0 | 64 |
| 4 | 64 | 0 | 0 | 64 | 0 | 0 | 64 |
| 5 | 64 | 0 | 0 | 64 | 0 | 0 | 64 |

It should also be understood that the special case of J=0 is one that the inventors believe falls within the scope of the present invention. Inspection of FIG. 6 will indicate that there are but two ranges defined and branch 76 will never be taken under these circumstances. This subprocess of the present invention is usable in practical applications in which low resolution display of characters are rarely encountered due to either the applications that are run, or employment of very high resolution display devices. In such an embodiment of the invention, the scaled glyph descriptors will always be hinted to physical pixel boundaries and the size of a character height value P in physical pixels will determine whether a grayscale rendering is performed by a scan converting and subpixel coordinates or whether a bilevel scan conversion is performed in physical pixel coordinates with the grayscale outputs being set to either maximum or minimum values.

Some of the most beneficial results of employment of the present invention are obtained in the display or printing of large characters. In particular, the use of both hinting and grayscale for displaying large characters has the effect of using a bilevel scan conversion for the vertical and horizontal strokes and taking advantage of the smoothing of diagonals accomplished by employment of a grayscale display. The former phenomenon results from the fact that the hinting moves the boundaries to cover entire physical pixels and therefore pixels that are illuminated are turned onto the full brightness of the available grayscale.

It should also be noted that it is important that the diagonal strokes being smoothed are greater than one and one half pixels wide. This is because human perception requires a fully illuminated pixel in the center of diagonal stroke to maintain the perception of high quality characters. As is known to those skilled in the art, two adjacent half pixel values do not equal a single fully illuminated pixel as perceived by the viewer.

From the foregoing it will be appreciated that the present invention indeed fulfills the need of the prior art described hereinabove and meets the above stated objects of the present invention. It overcomes the real and practical problems that have been observed in using hinted font descriptors created for bilevel pixel oriented display devices in systems driving grayscale level pixel oriented display devices. In view of the above described embodiments of the present invention, other embodiments suggest themselves to those skilled in the art and therefore the scope of the present invention should be limited only by the claims below and equivalents thereof.

We claim:

1. A method in a computer system of displaying a character on a pixel oriented grayscale display device having a predetermined resolution by constructing a pixel map of grayscale values comprising the steps of:

providing a geometric descriptor for said character;

providing a hinted geometric descriptor by hinting said geometric descriptor so that boundaries of serifs and stems lie on boundaries of physical pixels;

subdividing at least all of said physical pixels that are at least partially within a stroke of said hinted geometric descriptor into N sub-pixels, N being an integer;

performing a scan conversion on said hinted geometric descriptor with respect to said subpixels to provide a binary subpixel bit map of on-subpixels and off-subpixels;

for each said physical pixel that is at least partially within a stroke of said hinted geometric descriptor, assigning a grayscale value as a function of the number of said on-subpixels it contains raised to a power greater than one; and displaying said physical pixel on said display device using said grayscale value.

2. A method in a computer system of displaying a character on a pixel oriented grayscale display device having a predetermined resolution by constructing a pixel map comprising the steps of:

providing a geometric descriptor for said character;

receiving from an application a requested character space height and data specifying said predetermined resolution;

determining a character space height value P, in physical pixel units, from said requested character space height and said data specifying said predetermined resolution;

in response to said value P, rendering said character using a rendering method selected from a group of three rendering methods based on said value P, consisting of:

(a) grayscale rendering employing a subpixel level scan conversion;

(b) grid fitting said geometric descriptor for said character to physical boundaries and employing a physical pixel level scan conversion to provide a bilevel rendering; and (c) grid fitting said geometric descriptor for said character to physical boundaries and employing a subpixel level scan conversion to provide a grayscale rendering.

3. A method in a computer system of displaying a character on a pixel oriented grayscale display device having a predetermined resolution by constructing a pixel map comprising the steps of:

providing a geometric descriptor in a normalized character space for said character;

receiving from an application a requested character space height and data specifying said predetermined resolution;

scaling said geometric descriptor to provide a scaled geometric descriptor in physical pixel coordinates as a function of said predetermined resolution and said requested character space height;

determining a character space height value P, in physical pixel units, from said requested character space height and said data specifying said predetermined resolution;

comparing said character space height value P to selected values J and K, J and K each being positive integers and J being less than K; and (a) if P is less than J, performing a grayscale rendering of said character by:

subdividing at least all physical pixels that are at least partially within a stroke of said scaled geometric descriptor into N sub-pixels, N being an integer;

performing a scan conversion on said scaled geometric descriptor with respect to said subpixels to provide a binary subpixel bit map of on-subpixels and off-subpixels;

for each said physical pixel that is at least partially within a stroke of said scaled geometric descriptor, assigning a grayscale value in accordance with the number of said on-subpixels it contains; and displaying said physical pixel on said display device using said grayscale value; and alternately (b) if P is greater than or equal to J and less than or equal to K:

providing a hinted scaled geometric descriptor by hinting said scaled geometric descriptor so that boundaries of serifs and stems lie on boundaries of physical pixels;

performing a scan conversion on said hinted scaled geometric descriptor to provide a binary pixel bit map of on-pixels and off-pixels;

displaying each said physical pixel on said display device using a maximum grayscale value for pixels corresponding to said on-pixels in said binary pixel bit map and using a minimum grayscale value for pixels corresponding to said off-pixels in said binary pixel bit map; and alternately (c) if P is greater than K:

providing said hinted scaled geometric descriptor by hinting said scaled geometric descriptor so that boundaries of serifs and stems lie on boundaries of physical pixels; and performing said grayscale rendering of said character with respect to said hinted scaled geometric descriptor.

4. A method in a computer system of displaying a character on a pixel oriented grayscale display device as recited in claim 3 wherein said selected value J is six and said selected value K is twenty-four.

5. A method in a computer system of displaying a character on a pixel oriented grayscale display device as recited in claim 3 wherein said selected value J is in a range [6,7] and said selected value K is in a range [18,24].

6. A method in a computer system of displaying a character on a pixel oriented grayscale display device as recited in claim 3 wherein said step of comparing said character space height value P to selected values J and K is preceded by a step of:

reading a font specification stored in said computer to retrieve, if present, said selected values J and K; and providing default values for both said selected value J and said selected value K if said selected values are not found in said font specification.

7. A method in a computer system of displaying a character on a pixel oriented grayscale display device having a predetermined resolution by constructing a pixel map comprising the steps of:

providing a geometric descriptor in a normalized character space for said character;

receiving from an application a requested character space height and data specifying said predetermined resolution;

scaling said geometric descriptor to provide a scaled geometric descriptor in physical pixel coordinates as a function of said predetermined resolution and said requested character space height;

determining a character space height value P, in physical pixel units, from said requested character space height and said data specifying said predetermined resolution;

providing a hinted scaled geometric descriptor by hinting said scaled geometric descriptor so that boundaries of serifs and stems lie on boundaries of physical pixels;

comparing said character space height value P to a selected value K being a positive integer; and (a) if P is less than K:

performing a scan conversion on said hinted scaled geometric descriptor to provide a binary pixel bit map of on-pixels and off-pixels;

displaying each said physical pixel on said display device using a maximum grayscale value for pixels corresponding to said on-pixels in said binary pixel bit map and using a minimum grayscale value for pixels corresponding to said off-pixels in said binary pixel bitmap; and alternately (b) if P is greater than or equal to K:

subdividing at least all of said physical pixels that are at least partially within a stroke of said hinted scaled geometric descriptor into N sub-pixels, N being an integer;

performing a scan conversion on said hinted scaled geometric descriptor with respect to said subpixels to provide a binary subpixel bit map of on-subpixels and off-subpixels;

for each said physical pixel that is at least partially within a stroke of said hinted scaled geometric descriptor, assigning a grayscale value in accordance with the number of said on-subpixels it contains; and displaying said physical pixel on said display device using said grayscale value.

8. A method in a computer system of displaying a character on a pixel oriented grayscale display device as recited in claim 7 wherein said selected value K is in a range [18,24].

9. A method in a computer system of displaying a character on a pixel oriented grayscale display device as recited in claim 7 wherein said step of comparing said character space height value P to selected value K is preceded by a step of:

reading a font specification stored in said computer to retrieve, if present, said selected value K; and providing a default value for said selected value K if said selected value is not found in said font specification.

10. A method in a computer system of displaying a character on a pixel oriented grayscale display device having a predetermined resolution by constructing a pixel map comprising the steps of:

providing a geometric descriptor in a normalized character space for said character;

receiving from an application a requested character space height and data specifying said predetermined resolution;

scaling said geometric descriptor to provide a scaled geometric descriptor in physical pixel coordinates as a function of said predetermined resolution and said requested character space height;

determining a character space height value P, in physical pixel units, from said requested character space height and said data specifying said predetermined resolution;

comparing said character space height value P to selected values J and K, J and K each being positive integers and J being less than K; and (a) if P is less than J, performing a grayscale rendering of said character by determining a covered fraction of each said physical pixel that is at least partially within a stroke of said scaled geometric descriptor and assigning a grayscale value in accordance with said covered fraction; and displaying said physical pixel on said display device using said grayscale value; and alternately (b) if P is greater than or equal to J and less than or equal to K:

providing a hinted scaled geometric descriptor by hinting said scaled geometric descriptor so that boundaries of serifs and stems lie on boundaries of physical pixels;

performing a scan conversion on said hinted scaled geometric descriptor to provide a binary pixel bit map of on-pixels and off-pixels;

displaying each said physical pixel on said display device using a maximum grayscale value for pixels corresponding to said on-pixels in said binary pixel bit map and using a minimum grayscale value for pixels corresponding to said off-pixels in said binary pixel bit map; and alternately (c) if P is greater than K:

providing said hinted scaled geometric descriptor by hinting said scaled geometric descriptor so that boundaries of serifs and stems lie on boundaries of physical pixels; and performing said grayscale rendering of said character with respect to said hinted scaled geometric descriptor.

11. A method in a computer system of displaying a character on a pixel oriented grayscale display device as recited in claim 10 wherein said selected value J is six and said selected value K is twenty-four.

12. A method in a computer system of displaying a character on a pixel oriented grayscale display device as recited in claim 10 wherein said selected value J is in a range [6,7] and said selected value K is in a range [18,24].

13. A method in a computer system of displaying a character on a pixel oriented grayscale display device as recited in claim 10 wherein said step of comparing said character space height value P to selected values J and K is preceded by a step of:

reading a font specification stored in said computer to retrieve, if present, said selected values J and K; and providing default values for both said selected value J and said selected value K if said selected values are not found in said font specification.

* * * * *